United States Patent

[11] 3,633,694

[72] Inventor Roger W. Riehl
 Troy, Ohio
[21] Appl. No. 40,257
[22] Filed May 25, 1970
[45] Patented Jan. 11, 1972
[73] Assignee Allied Technology Inc.
 Troy, Ohio

[54] WEIGHING SCALE
 7 Claims, 6 Drawing Figs.
[52] U.S. Cl. .................................................. 177/165
[51] Int. Cl. ............................................ G01g 13/14,
 G01g 23/14
[50] Field of Search .......................................... 177/164,
 165, 177, 178, 173; 353/40, 41

[56] References Cited
 UNITED STATES PATENTS
1,870,233 8/1932 Bryce ............................. 177/164
2,085,345 6/1937 Tuttle et al. .................... 177/165
3,200,896 8/1965 Bell et al. ....................... 177/178 UX
3,387,676 6/1968 Porter ............................ 177/165 X FOREIGN PATENTS
1,086,843 10/1967 Great Britain ................ 177/178

Primary Examiner—Richard B. Wilkinson
Assistant Examiner—George H. Miller, Jr.
Attorney—Marechal, Biebel, French & Bugg ABSTRACT: A container of material is weighed on apparatus including a movable platform which is supported by an adjustable balance mechanism. An indicator is connected to move with the balance mechanism and is positioned adjacent a graduated scale to provide a readout of the net weight of the material when the container of material is placed on the platform and the tare weight of the container when the container of material is removed from the platform. The indicator consists of a platelike vertical shutter which moves vertically behind a faceplate having a transparent horizontal slot. The shutter has multiple transparent color zones which cooperate with a light source to indicate the tare and net weights by lines of different colors and corresponding in length to the weights. A tare knob is positioned adjacent the platform and provides for adjusting the balance mechanism to accommodate various containers having different tare weights.

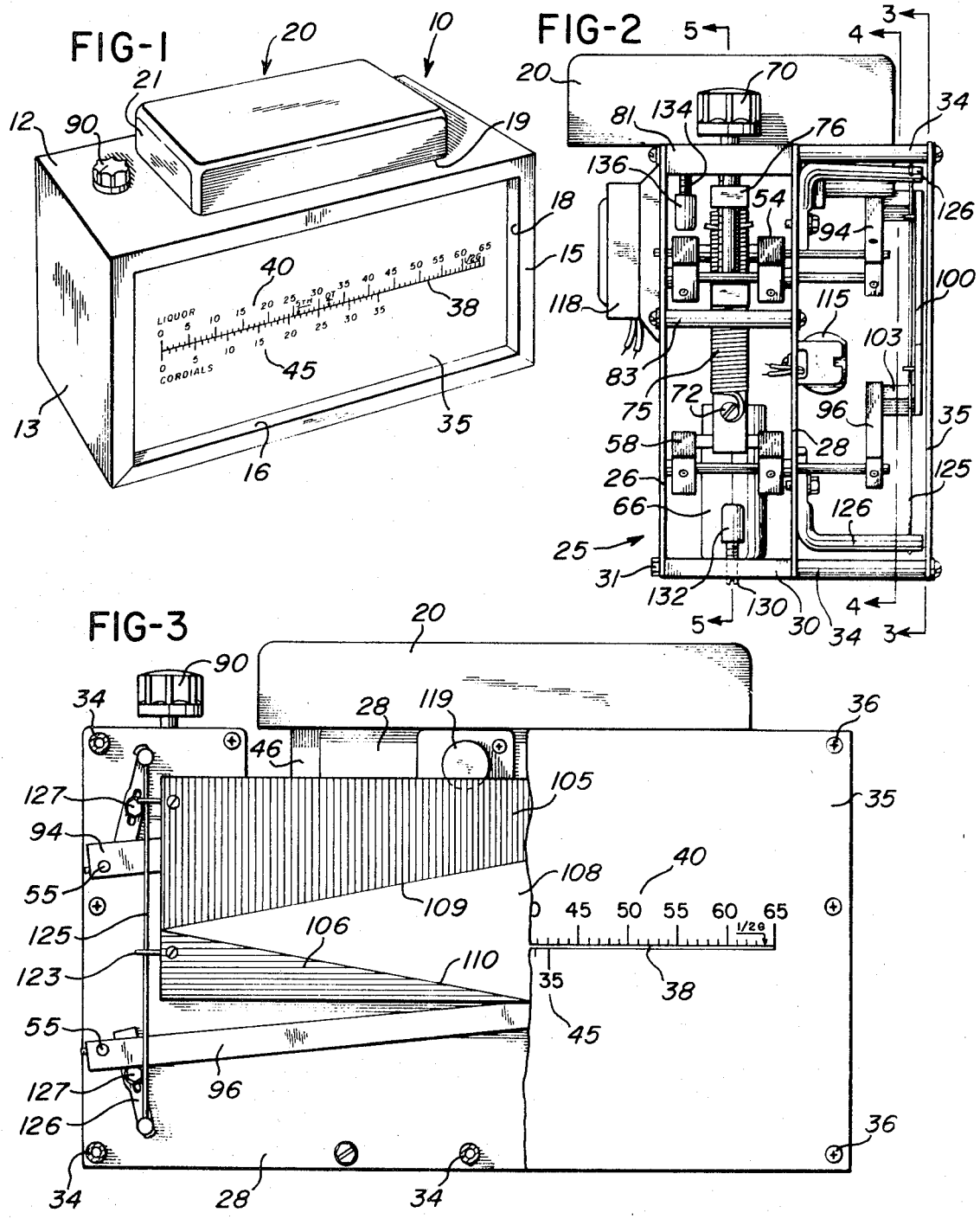

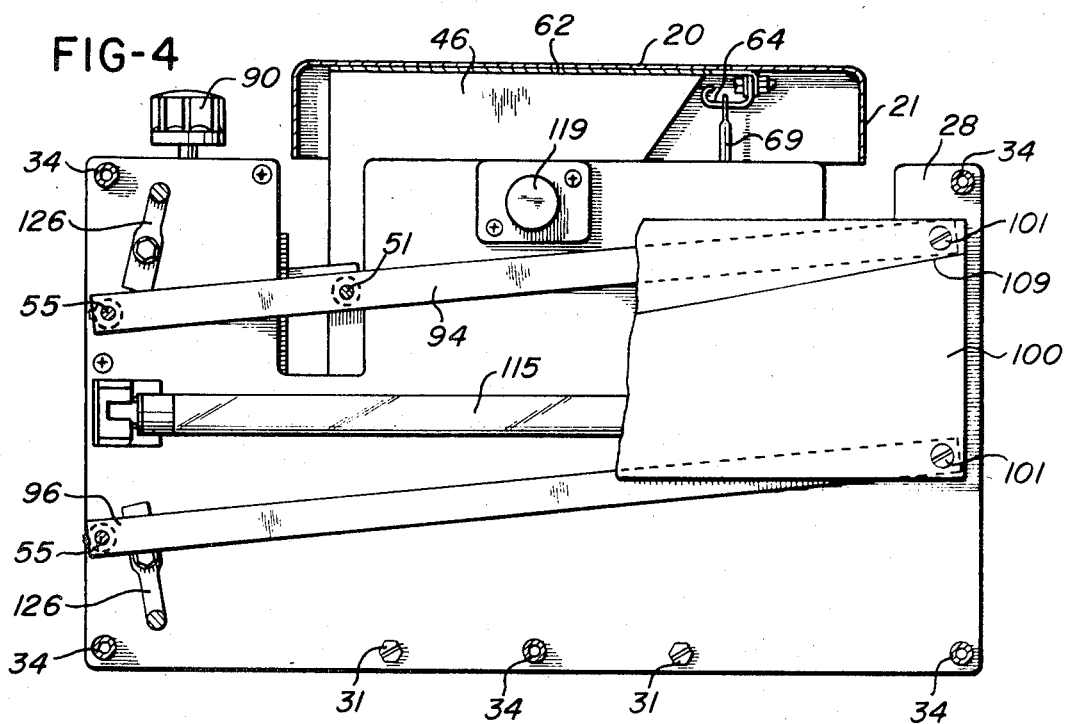
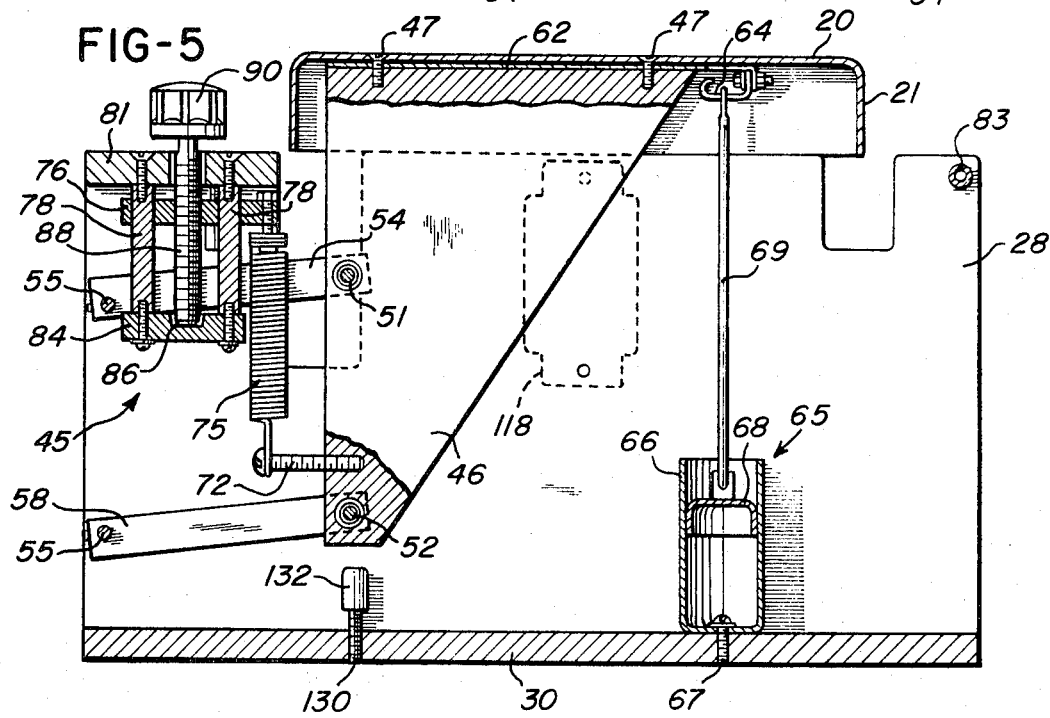

3,633,694

WEIGHING SCALE

BACKGROUND OF THE INVENTION

In some businesses, it is necessary to take periodic inventories of liquid or solid materials which are stored within a number of different containers, many of which are partially emptied. For such inventory purposes, it is desirable to employ a weighing scale which can be set according to the tare weight of each container so that the indicated value of the scale represents the net weight of the material within the container. An example of such a weighing scale is disclosed in U.S. Pat. No. 3,481,413, wherein the circular face plate of the scale is adjusted or dialed according to the predetermined tare weight of the container.

One type of business in which the taking of periodic inventories of a liquid material is desirable, is in the operation of a cocktail lounge where numerous bottles of liquors and cordials of different brands are maintained. Usually, a large portion of the inventory consists of partially emptied or opened bottles of liquors and cordials, and each bottle has a different tare weight. To minimize the time required to take inventory, it is highly desirable to be able to determine quickly and conveniently the net weight of the liquor or cordial in each open bottle.

SUMMARY OF THE INVENTION

The present invention is directed to an improved weighing scale which is particularly adapted for quickly and conveniently determining the net and tare weights of a container of material and which is ideally suited for use in taking periodic inventories of the open bottles of various liquors and cordials maintained at a cocktail lounge. As one particular feature, the weighing scale of the invention provides for conveniently reading on a graduated scale the net weight of a material within a container when the container is placed on the scale platform and for reading on the same graduated scale the tare weight of the container when the container of material is removed from the platform. As another feature, the weighing scale provides for differentiating between the average values of specific gravity of cordials and the average values of specific gravity of liquors by use of either of two corresponding graduated scales.

In accordance with a preferred embodiment of the invention, a weighing scale includes a boxlike housing having a front vertical wall or face plate which defines a horizontally extending transparent slot. Graduations are provided along the top of the slot for bottles of liquor and along the bottom of the slot for bottles of cordials. A platelike vertical shutter is supported for vertical movement directly behind the slot by a spring loaded parallelogram balance mechanism which also supports a platform projecting from the top wall of the housing.

An exposed knob is provided for adjusting the spring bias on the balance mechanism, and a damper is provided to prevent the mechanism from vibrating. The shutter is provided with multiple color transparent zones separated by a black opaque zone of V-shaped configuration so that the shutter cooperates with the slot to provide one color line which represents the tare weight of the container and another color line which represents the net weight of the material or contents of the container. A light source is positioned behind the shutter to assure that the color lines are clearly visible.

Other features and advantages of the invention will be apparent from the following description, the accompanying drawings and the appended claims.

BRIEF DESCRIPTION OF THE DRAWINGS

FIG. 1 is a perspective view of a weighing scale constructed in accordance with the invention;

FIG. 2 is an end view of the weighing scale with the housing removed;

FIG. 3 is a front view of the scale with a portion of the front wall or face plate broken away and taken generally on the line 3—3 of FIG. 2;

FIG. 4 is a section taken generally on the line 4—4 of FIG. 2 with a portion of the shutter broken away;

FIG. 5 is a section taken generally on the lines 5—5 of FIG. 2; and

DESCRIPTION OF THE PREFERRED EMBODIMENT

Figure 6:
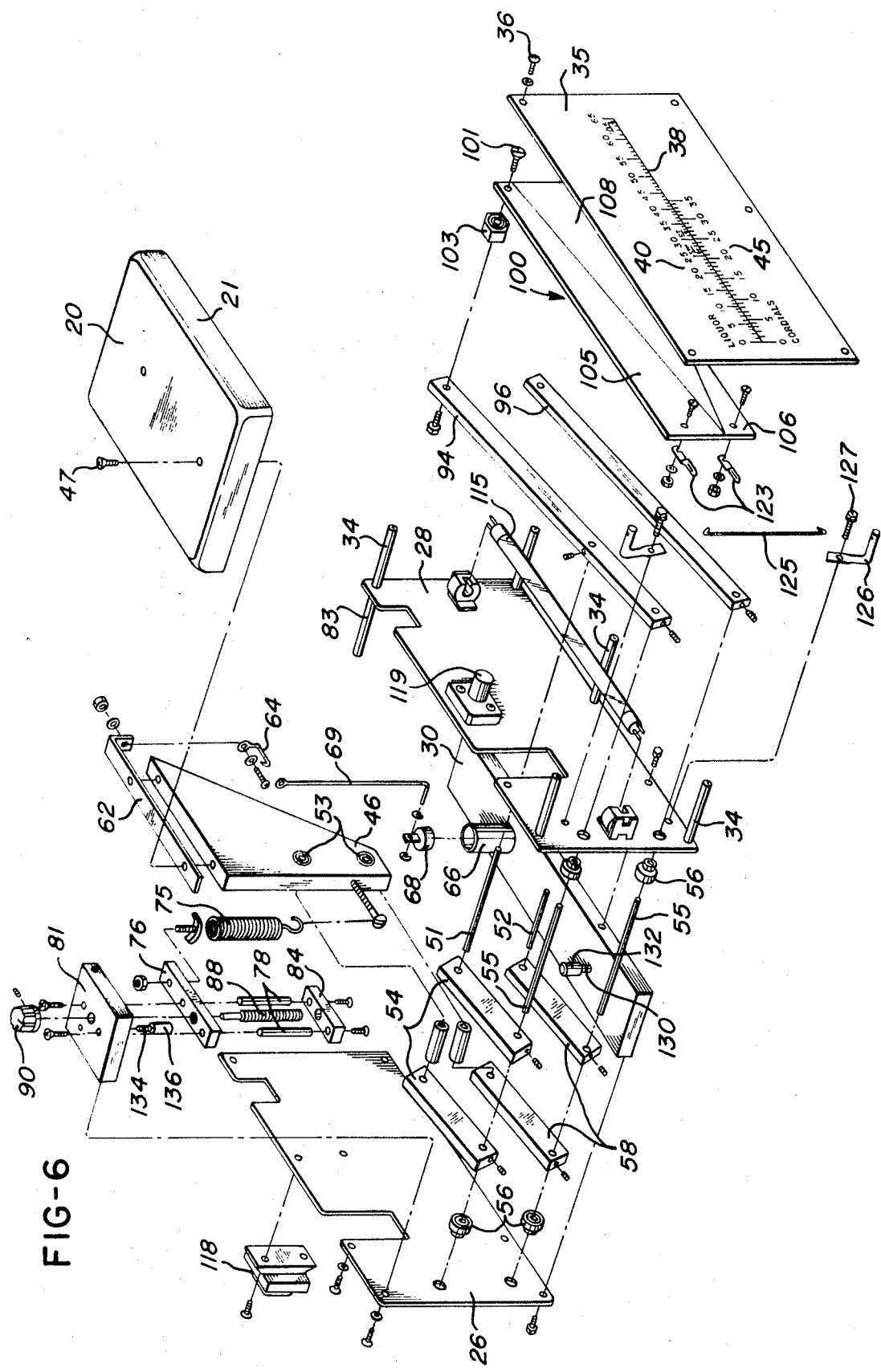
FIG. 6 is an exploded perspective view of the internal components of the weighing scale shown in FIGS. 2-5.

FIG. 1 shows a weighing scale constructed in accordance with the invention and which includes a sheet metal boxlike housing 10 having a top wall 12, opposite end walls 13 and a rear wall (not shown). The housing 10 also includes a U-shaped frame portion 15 which cooperates with a mating frame portion 16 formed as a part of the bottom wall to define a rectangular opening 18. A rectangular opening 19 is formed within the top wall 12 of the housing for receiving a formed sheet metal rectangular platform 20 having a downwardly extending peripheral skirt 21 which extends through the opening 19.

A frame structure 25 is positioned within the housing 10 and includes a set of spaced vertical side plates or walls 26 and 28 (FIGS. 2 and 6) which are rigidly secured to a baseplate 30 by a series of screws 31. The baseplate 30 is secured to the bottom wall (not shown in FIG. 2) of the housing 10 by a series of longitudinally spaced screws (now shown), and a series of five horizontal support posts 34 project forwardly from the plate 28 to support a front wall or face plate 35 which is retained by a series of screws 36. The face plate 35 is positioned adjacent the frame portions 16 and 18 of the housing 10 to cover the opening 18 and is formed of a transparent sheet plastic which is coated by a silk screening process on its inner surface to define a narrow horizontally extending transparent slot 38.

A linear scale 40 extends along the top of the slot 38 and is graduated in ounces from 0 to 65 ounces with additional interval markings corresponding to a fifth of a gallon, a quart and a half gallon. As will be explained later, the scale 40 is particularly useful for weighing bottles of liquor. Another linear scale 45 extends along the bottom of the slot 38 and is graduated in ounces from 0 to 35 ounces with interval markings corresponding to a fifth of a gallon and a quart. The scale 45 is adapted for weighing bottles of cordials.

The platform 20 is supported by a weight sensing or balance mechanism including a generally triangular-shaped vertical plate 46 (FIG. 5) which projects upwardly into the platform 20 and secured to the platform by a pair of screws 47. The plate 46 is mounted on vertically spaced pins 51 and 52 which extend through corresponding antifriction bearings 53 (FIG. 6) recessed within the plate 46. The upper cross pin 51 is supported by a pair of link members or arms 54 which are rigidly mounted on a cross pin or shaft 55 rotatably supported by antifriction bearings 56 mounted within aligned holes formed within the side plates 26 and 28 of the frame 25. The lower cross pin 52 is supported by a pair of lower link members or arms 58 rigidly secured to a lower pin or shaft 55 which is also rotatably supported by antifriction bearings 56 mounted within aligned holes formed within the side plates 26 and 28.

A metal strap 62 (FIG. 5) is confined between the platform 20 and the upper edge of the support plate 46 and has a projecting end portion which supports a wire formed hook member 64. A pneumatic damper mechanism 65 is mounted on the base wall 30 and includes a cylindrical cup 66 which is secured to the base wall by a screw 67. An inverted cuplike cap 68 is slidably mounted within the cup 66, and a wire formed link rod 69 connects the cap 68 to the hook member 64 so that the mechanism 65 is effective to dampen pneumatically the movement of the platform 20.

A screw 72 (FIG. 5) is threaded into the vertical edge of the support plate 46, and a tension spring 75 connects the screw 72 to the cantilevered end portion of a bar 76 slidably mounted on spaced vertical guide rods 78. The upper ends of the guide rods 78 are rigidly secured to a cross plate 81 which cooperates with the baseplate 30 and a series of rods 83 to space the sidewalls 26 and 28 in parallel relation. The lower ends of the guide rods 78 are rigidly connected by a plate 84 having a recess 86 for receiving the lower end of a vertical adjusting screw 88 which is threaded through the plate 76. A knob 90 is mounted on the upper end of the adjusting screw 88 so that the screw may be conveniently rotated to raise and lower the plate 76 for adjusting the upward tension of the spring 75 on the platform support plate 46.

Referring to FIG. 4, an elongated arm 94 is positioned in front of the wall 28 and is rigidly secured to the forward projecting end portions of the upper cross-shafts or pins 51 and 55 so that the arm slopes upwardly to the right. A lower arm 96 is rigidly secured to the projecting forward end portion of the lower cross-shaft or pin 55 and extends parallel to the arm 28. Thus the arms 94 and 96 are connected to pivot with the arms 54 and 58 and form a parallelogram linkage system. A rectangular platelike vertical indicating member or shutter 100 has its right edge portion (FIG. 4) secured by screws 101 to corresponding antifriction bearings 103 mounted on the adjacent end portions of the arms 94 and 96. The shutter 100 is preferably formed of a rigid transparent sheet plastic, and its front face is coated by a silk-screening process to form a semitransparent upper blue zone 105 (FIG. 3) and a semitransparent lower red zone 106 which are separated by an opaque black zone 108. The latter opaque zone 108 is defined by edge lines 109 and 110 (FIG. 3) which converge to a point adjacent the left edge of the shutter 100.

As shown in FIG. 2, the shutter 100 is positioned directly behind the face plate 35, and a fluorescent lamp 115 is supported by the sidewall 28 in back of the shutter 100. A transformer 118 is mounted on the rear sidewall 26 for supplying power to the fluorescent lamp 115 through a stater 119 which is mounted on the upper edge portion of the forward sidewall 28 so that it is accessible by removing the platform 20. A pair of eye members 123 are mounted on the left edge portion (FIG. 3) of the shutter 100 and have horizontal slots for receiving a vertical guide wire 125 which extends between two right-angle brackets 126 adjustably secured to the front sidewall 28 of the frame 25 by corresponding screws 127.

Referring to FIGS. 2 and 5, an adjusting screw 130 is threaded through the base wall 30 of the frame 25 and carries a resilient plastic cap 132 to form a bottom stop or limit to the downward movement of the support plate 46, the platform 20 and the shutter 100. A similar stop screw 134 (FIG. 2) is threaded into the upper cross plate 81 of the frame 25 and also carries a resilient plastic cap 136 which is adapted to engage one of the upper support arms 54 to form a stop or limit to the upward movement of the plate 46, the platform 20 and the shutter 100.

To use the weighing scale described above for determining the net weight of an inventory of liquors or cordials, electrical power is supplied to the transformer 118 through a power supply cord (not shown) to energize the fluorescent lamp 115. To determine the tare weight of a bottle which is full of liquor, such as a fifth of a gallon, the bottle is placed on the platform 20, and the tare knob 90 is rotated until the end of the blue line within the slot 38 is located at the mark on the faceplate scale 40 indicating a fifth. That is, the know 90 is adjusted until the edge line 109 crosses the graduation of 25.6 ounces on the scale 40. When the bottle is lifted from the platform 20, the blue line diminishes to zero, and a red line appears in the slot 38. Where the red line ends or where the edge line 110 crosses the slot 38, indicates the tare weight of the bottle.

The tare weight of an empty bottle may be quickly determined simply by placing the bottle on a platform 20 and rotating the tare knob 90 until either the blue line or the red line disappears within the slot 38. This indicates that the point of the black opaque zone 108 is located at the end of the slot 38. When the empty bottle is removed from the platform 20, a red line will appear in the slot 38 to indicate the new weight of the bottle.

When it is desired to determine the net weight of liquor within a partially emptied or open bottle, the tare knob 90 is rotated until the value of the tare weight, which has been previously determined from either a full or empty bottle, is indicated by a red line within the slot 38. The open bottle is then placed on the platform 20, causing the red line to disappear and a blue line to appear within the slot 38 to indicate the net weight in ounces of the liquor remaining in the bottle. To determine the net weight of a cordial within a bottle, the same procedure as described above for liquor is used except that the bottom graduated scale 45 is employed instead of the upper graduated scale 40. The difference in the graduated scales 40 and 45 corresponds to the difference in the specific gravities between a liquor and a cordial.

From the drawings and the above description, it is apparent that a weighing device or scale constructed in accordance with the invention provides desirable features and advantages. For example, the scale provides for quickly and conveniently determining both the net weight and the tare weight of a container of material. Furthermore, both the net weight and the tare weight values are indicated on the same graduated readout scale thereby simplifying the use of the instrument. The linear graduated scale 40 or 45 is also convenient to read, and the fluorescent light 115 cooperates with the multiple color shutter 100 to provide for a clear and distinct linear readout of the net and tare weights.

Another important feature is provided by the conveniently located tare knob 90 for adjusting the spring tension exerted on the support or balance mechanism for the platform 20 and the shutter 100. That is, a few revolutions of the tare knob 90 is effective to extend either the blue line or the red line within the slot 38 the full length of the graduated scale 40. Thus the tare weight of a container can be quickly entered into the balance system, or the balance system can be quickly adjusted for different containers having different tare weights.

While the operation of a weighing scale constructed in accordance with the invention is explained above in connection with the weighing of a bottle of liquor or cordial, it is to be understood that it is within the scope of the invention to adapt the weighing scale for determining the net and tare weights of any container or receptacle of material or for merely weighing a material or objects. Furthermore, while the structure herein described constitutes a preferred embodiment of the invention, it is to be understood that the invention is not limited to this precise structure, and that changes may be made therein without departing from the scope of the invention which is defined in the appended claims.

What is claimed is:

1. An improved weighing device adapted for weighing a material within a container, comprising movable weight-sensing means for supporting a container of material, a readout scale having progressively increasing weight graduations commencing from a zero position, indicating means positioned adjacent said readout scale, means for causing relative movement between said readout scale and said indicating means in response to movement of said weight sensing means, said indicating means being effective to move from said zero position upwardly along said readout scale when said container of material is placed on said weight-sensing means and to indicate directly on said readout scale the net weight of the material within said container, said indicating means also being effective to move from said zero position upwardly along said readout scale when said container of material is removed from said weight-sensing means and to indicate directly on the same said readout scale the tare weight of said container, and adjusting means for causing relative movement between said indicating means and said readout scale without changing the weight on said weight-sensing means.

2. A weighing device as defined in claim 1 wherein said readout scale has graduations in ounces for indicating the net and tare weights of a bottle of liquor, a second readout scale extending adjacent the first said readout scale and also having graduations in ounces, and said indicating means cooperating with second readout scale for indicating the tare and net weights of a bottle of cordial.

3. An improved weighing device adapted for weighing a material within a container, comprising a housing having a faceplate, means defining a linear substantially transparent slot within said faceplate, a linear readout scale extending adjacent said slot, a movable indicating member positioned behind said slot and having means for providing within said slot a visual line which varies in length in response to movement of said indicating member, movable weight sensing means for supporting a container of material, means for causing movement of said indicating member relative to said slot in response to movement of said weight-sensing means, said indicating member and said readout scale cooperating to indicate on said readout scale the net weight of the material within said container when said container of material is placed on said weight-sensing means and to indicate on the same said readout scale the tare weight of said container when said container of material is removed from said weight-sensing means, and adjusting means for causing relative movement between said indicating member and said readout scale without changing the weight on said weight-sensing means.

4. A weighing device as defined in claim 3 wherein said housing has a boxlike configuration and includes an upper wall, and an inverted cuplike said platform projecting upwardly from said top wall.

5. A weighing device as defined in claim 3 wherein said movable indicating member comprises a generally flat shutter, means supporting said shutter for movement substantially parallel to said faceplate, at least two different color zones on said shutter, one of said color zones cooperating with said slot and said readout scale to indicate the net weight of the material within said container, and the other said color zone cooperating with said slot and said readout scale to indicate the tare weight of said container.

6. A weighing device as defined in claim 5 wherein said means supporting said shutter comprises a set of generally parallel arms movable with said weight-sensing means.

7. A weighing device as defined in claim 5 including a light source positioned behind said shutter and said slot, and each said color zone is transparent to provide for illuminated color lines within said slot.

* * * * *